US011709230B2

(12) United States Patent
Matthews et al.

(10) Patent No.: US 11,709,230 B2
(45) Date of Patent: Jul. 25, 2023

(54) GEODESIC SYSTEM AND METHOD OF USE

(71) Applicant: John Matthews, Carthage, NC (US)

(72) Inventors: John Matthews, Carthage, NC (US); Steven Hinkle, Cary, NC (US)

(*) Notice: Subject to any disclaimer, the term of this patent is extended or adjusted under 35 U.S.C. 154(b) by 1230 days.

(21) Appl. No.: 16/159,409

(22) Filed: Oct. 12, 2018

(65) Prior Publication Data
US 2019/0113604 A1 Apr. 18, 2019

Related U.S. Application Data

(60) Provisional application No. 62/571,621, filed on Oct. 12, 2017.

(51) Int. Cl.
| *G01S 7/481* | (2006.01) |
| *G01S 17/48* | (2006.01) |
| *G01C 15/00* | (2006.01) |
| *G01S 17/46* | (2006.01) |
| *G01S 17/08* | (2006.01) |

(52) U.S. Cl.
CPC .......... *G01S 7/4817* (2013.01); *G01C 15/002* (2013.01); *G01S 17/08* (2013.01); *G01S 17/46* (2013.01); *G01S 17/48* (2013.01)

(58) Field of Classification Search
CPC ........ G02B 5/08; G02B 5/122; G01S 7/4817; G01S 17/08; G01S 17/46; G01S 17/48; G01C 3/26; G01C 15/002
See application file for complete search history.

(56) References Cited

U.S. PATENT DOCUMENTS

| 4,352,556 A * | 10/1982 | Haefliger | G02B 7/182 |
| | | | 356/144 |
| 6,381,006 B1 * | 4/2002 | Ramstrom | G01C 15/002 |
| | | | 356/152.1 |
| 2001/0048518 A1* | 12/2001 | Shirai | G01C 3/08 |
| | | | 356/5.1 |

(Continued)

FOREIGN PATENT DOCUMENTS

| CN | 106289202 A * | 1/2017 | ............. G01C 15/02 |
| KR | 101210539 B1 * | 12/2012 | |

(Continued)

*Primary Examiner* — Luke D Ratcliffe
(74) *Attorney, Agent, or Firm* — Michael Best & Friedrich LLP

(57) ABSTRACT

A geodesic system for measuring the position of a target when the target is obstructed from view by a station. The geodesic system includes a rod fastener positioned on a housing axis for selectively coupling a housing to a survey rod, wherein the housing axis is collinear with a rod axis centrally-positioned within the survey rod when the system is coupled to the survey rod. The system further includes a cuboid-shaped station-scope for viewing the station along a station-line extending between the system and the station and for viewing the target along a target-line extending between the system and the target. The station-scope includes a mirror equally bisecting the station-scope. The housing axis equally bisects the mirror at an intersection of the station-line and the target-line. The station further includes a rangefinder for aligning a laser with the target, the laser having an origination point along the housing axis.

15 Claims, 9 Drawing Sheets

(56) References Cited

U.S. PATENT DOCUMENTS

| | | | | |
|---|---|---|---|---|
| 2013/0329218 A1* | 12/2013 | Vogel | ................ | G01C 3/08 |
| | | | | 356/139.1 |
| 2014/0163775 A1* | 6/2014 | Metzler | ................ | G01S 19/071 |
| | | | | 701/2 |
| 2014/0210663 A1* | 7/2014 | Metzler | ................ | G01S 19/51 |
| | | | | 342/357.34 |
| 2014/0247439 A1* | 9/2014 | Neier | ................ | G01S 7/003 |
| | | | | 356/4.01 |
| 2014/0350886 A1* | 11/2014 | Metzler | ................ | G01S 7/003 |
| | | | | 702/150 |
| 2015/0253137 A1* | 9/2015 | Jensen | ................ | G01C 15/006 |
| | | | | 356/4.01 |
| 2017/0067739 A1* | 3/2017 | Siercks | ................ | G01C 15/002 |

FOREIGN PATENT DOCUMENTS

| | | | | |
|---|---|---|---|---|
| KR | 101212740 B1 * | 12/2012 | | |
| WO | 2002050564 A2 | 6/2002 | | |
| WO | 2006034685 A1 | 4/2006 | | |
| WO | WO-2006034685 A1 * | 4/2006 | ............ | G01C 15/00 |

* cited by examiner

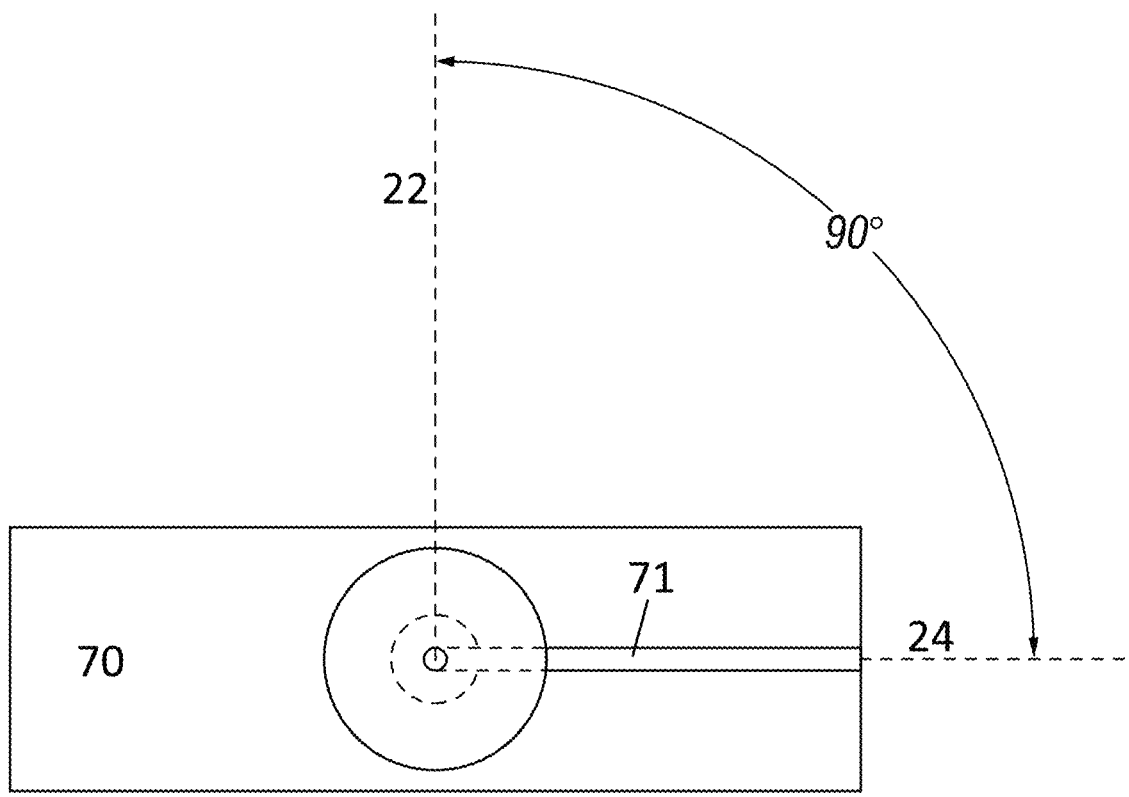
FIG. 4
FIG. 5
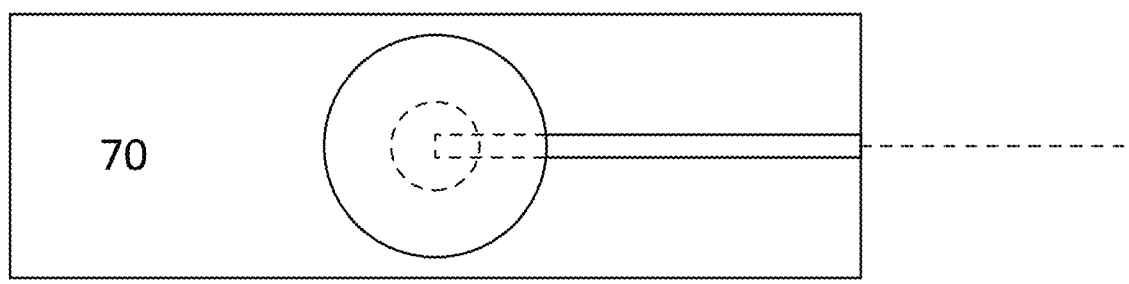

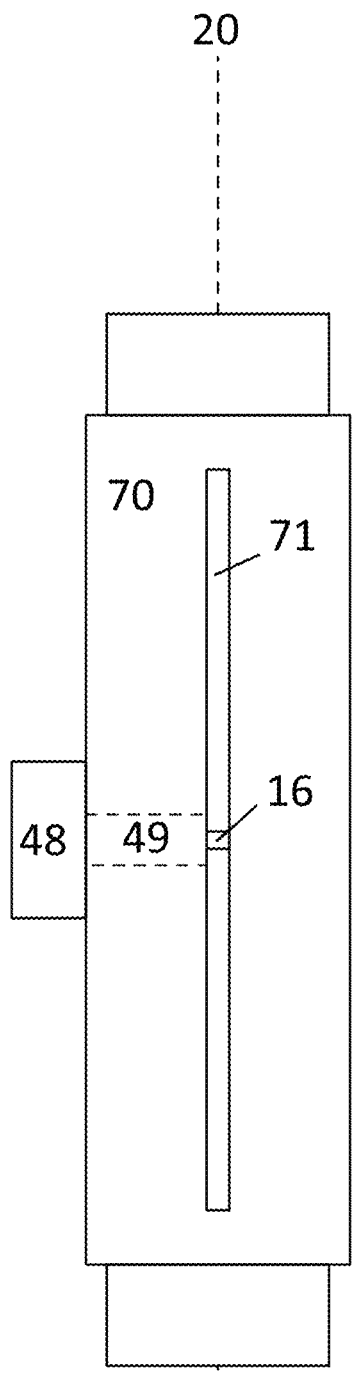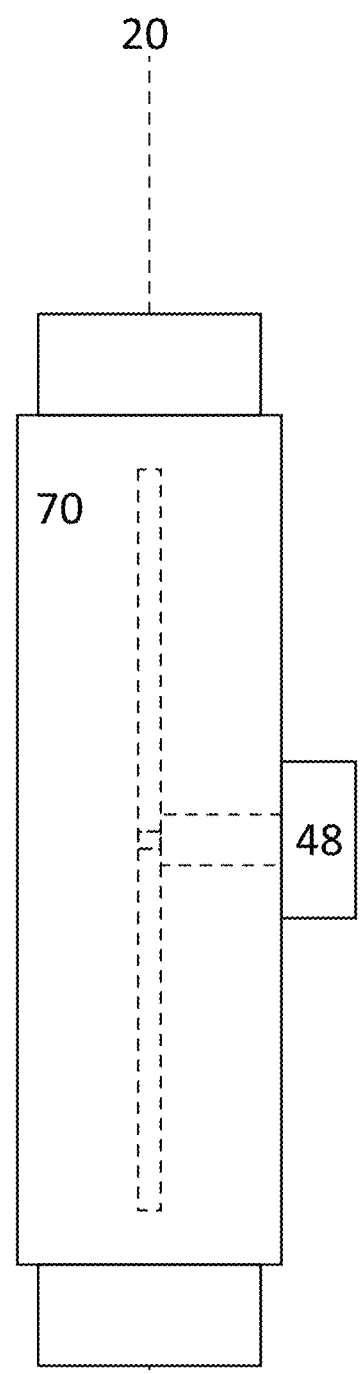
FIG. 6
FIG. 7

GEODESIC SYSTEM AND METHOD OF USE

CROSS REFERENCE TO RELATED APPLICATIONS

This application is a non-provisional of U.S. Provisional Patent Application 62/571,621 filed Oct. 12, 2017, the contents of which are incorporated herein in their entirety.

TECHNICAL FIELD

The present disclosure relates generally to a geodesic system for measuring the position of a target relative to a survey rod. More specifically, the present disclosure relates to a geodesic system for measuring the position of a target relative to a survey rod when the target is obstructed from view by a station but there remains a line of sight between the survey rod and the station.

BACKGROUND

Surveying from a station (or total station theodolite or robotic total station) involves making an electro-optical measurement between the station and a survey rod positioned at a target. The measurement of the angle and/or distance between the station and the rod can be used to determine the angle and/or distance between the station and a particular point on the target. Often times, the survey rod cannot be placed in direct proximity to the target due to an obstruction in the line of sight between the target and the station. In such cases, an offset measurement must be made by placing the survey rod at a distance away from the target which allows an unobstructed view between the station and the rod, and the rod and the target.

Manual methods of making offset measurements have inherent inaccuracies unsuitable for many surveying or construction projects. There remains a need to provide accurate and timely offset measurements between a target and a station. Disclosed herein are one or more devices and methods that advantageously address these issues.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

According to at least one embodiment, a geodesic system is provided. The geodesic system includes a rod fastener of a housing positioned on a housing axis for selectively coupling the housing to a survey rod, wherein the housing axis is collinear with a rod axis centrally positioned within the survey rod when the system is coupled to the survey rod; a cuboid-shaped station-scope for viewing the station along a station-line extending between the system and the station and for viewing the target along a target-line extending between the system and the target, wherein the station-scope includes a mirror equally bisecting the station-scope, and wherein the housing axis equally bisects the mirror; a rangefinder for aligning a laser with the target, the laser having an origination point along the housing axis.

According to at least one embodiment, a geodesic system is provided. The geodesic system includes a rod fastener of the housing positioned on a housing axis for selectively coupling the housing to a survey rod, wherein the housing axis is collinear with a rod axis centrally positioned within the survey rod when the system is coupled to the survey rod; a station-scope centrally positioned on the housing axis for viewing the station along a station-line extending between the system and the station; a target-scope housing a right-angle prism for viewing a target-line to the target and, in conjunction with the station-scope, for aligning the target-line perpendicularly with the station-line, wherein a midpoint on a right-angle edge of the prism is positioned on the housing axis; a rangefinder for aligning a laser with the target, the laser having an origination point along the housing axis.

According to at least one embodiment, a method of measuring a position of an offset target is provided. The method includes aligning a view of a station-scope along a station-line to a station, aligning a view of the station-scope along a target-line to a target while maintaining the view along the station-line to the station, aligning a rangefinder for measuring a distance to the target, and measuring the position of the target.

According to at least one embodiment, a method of measuring a position of an offset target is provided. The method includes aligning a view of a station-scope along a station-line to a station, aligning a view of a target-scope along a target-line to a target while maintaining the view of the station-scope along the station-line to the station, aligning a rangefinder for measuring a distance to the target, and measuring the position of the target.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

FIG. 4 is a top view of the housing of the system according to one or more embodiments of the present invention.

FIG. 5 is a bottom view of the housing of the system according to one or more embodiments of the present invention.

FIG. 6 is a right side view of the housing of the system according to one or more embodiments of the present invention.

FIG. 7 is a left side view of the housing of the system according to one or more embodiments of the present invention.

DETAILED DESCRIPTIONS

Figure 1:
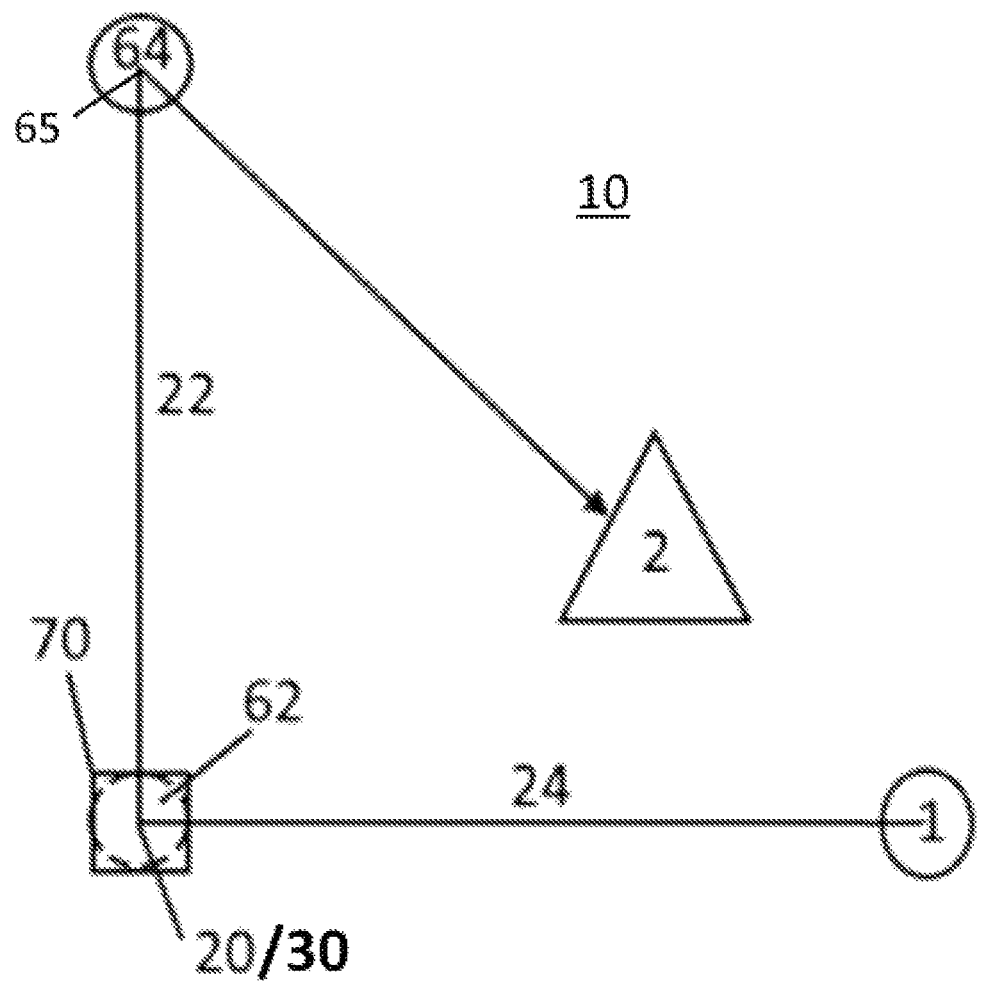
FIG. 1 is an overhead, two-dimensional view of a station and housing, where a target is obstructed from view from the station according to one or more embodiments of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Two lines are perpendicular if they meet at a right angle. Two lines are called if they are parallel to lines that meet at a right angle.

As will be discussed in more detail herein, this application discloses various embodiments of a geodesic system 10 for measuring a position of a target 1 when the target 1 is obstructed from view by an obstruction 2 between the target 1 and a station 64. The station 64 may be any total station or total station theodolite surveying instrument known or developed for surveying and/or construction. Typically a map or boundary is surveyed using a station 64 measuring the location of a survey rod 62 positioned at a target 1 for determining the location 60 of the target 1, the target location 60 being relative to the station 64. When an obstruction 2, such a tree or structure, obstructs the view of the target 1 and/or survey rod 62 by the station 64, the survey rod 62 must be placed at an 'offset' location away from the target 1, and the location 60 of the target 1 may then be calculated by determining a position of the survey rod 62 relative the station 64 and a position of the target 1 relative the survey rod 62.

For example, as depicted in FIG. 1, the obstruction 2 may obstruct view of the target 1 by the station 64. In such an example, a housing 70 and/or survey rod 62 of the system 10 may be positioned to be viewable by the station 64 along a station-line 22 so that the station-line 22 is perpendicularly aligned with a target-line 24 between the target 1 and the housing 70 and/or survey rod 62. The station-line 22 may intersect with the target-line 24 at a intersection-point 30 on the housing axis 20. The intersection-point 30 may be located, and even centrally located, within a housing 70 attached to a top of a survey rod 62.

According to some embodiments of the geodesic system 10, the system 10 includes a housing 70 for selective attachment or coupling to a survey rod 62. The system 10 may also include the station 64 and/or survey rod 62. The housing 70 may include and/or define a station-scope (or station viewing port) 12, target-scope (or target viewing port) 14, a rangefinder 16, a rod fastener 72, a prism fastener 74 and/or a station prism 76. The housing 70 may define a body or structure for positioning some of the components of the system 10 with respect to each other. The rod fastener 72 may be configured for selectively attaching or coupling the housing 70 to a survey rod (or other surveying instrument) 62. The housing prism fastener 74 may be configured for selectively attaching or coupling the housing 70 with a station prism 76 detectable by the station 64.

A housing axis 20 may be positioned centrally and extend vertically through the housing 70. The rod fastener 72 and/or the prism fastener 74 may be centered along the housing axis 20 for aligning the housing 70 with the survey rod 62 and for aligning the station prism 76 with the housing 70. When the housing 70 is coupled to the survey rod 62, the housing axis 20 may be collinear with a rod axis 66 centrally positioned and extending vertically through the survey rod 62. Aligning the housing axis 20 with the rod axis 66 ensures the housing 70 is coextensive with the survey rod 62 and capable of accurately measuring the relative locations of the station 64, intersection-point 30 and target 1. The housing 70 may be rotatable about the housing axis 20 at the rod fastener 72 and/or the prism fastener 74 when coupled to the survey rod 62 and/or station prism 76, respectively.

A station-line 22 may extend between a station-point 65 on the station 64 and an intersection-point 30 of the housing 70, the intersection-point 30 being positioned on the housing axis 20. Due to the shape and configuration of the housing 70, although the intersection-point 30 may be centrally located within the housing, the point 30 may not be exactly horizontally and/or vertically centered within the housing 70 in some embodiments. The survey rod 62 and/or housing 70 may be kept in a true vertical position so that the rod 62 and/or housing 70 is not angled relative to the "plane" of the Earth (i.e., has no inclination). A bubble tube, digital level or other device may be used to ensure true vertical position of the rod 62 and/or housing 70. The system 10 and/or housing 70 may include a bubble tube, digital level or other such device.

Figure 2:
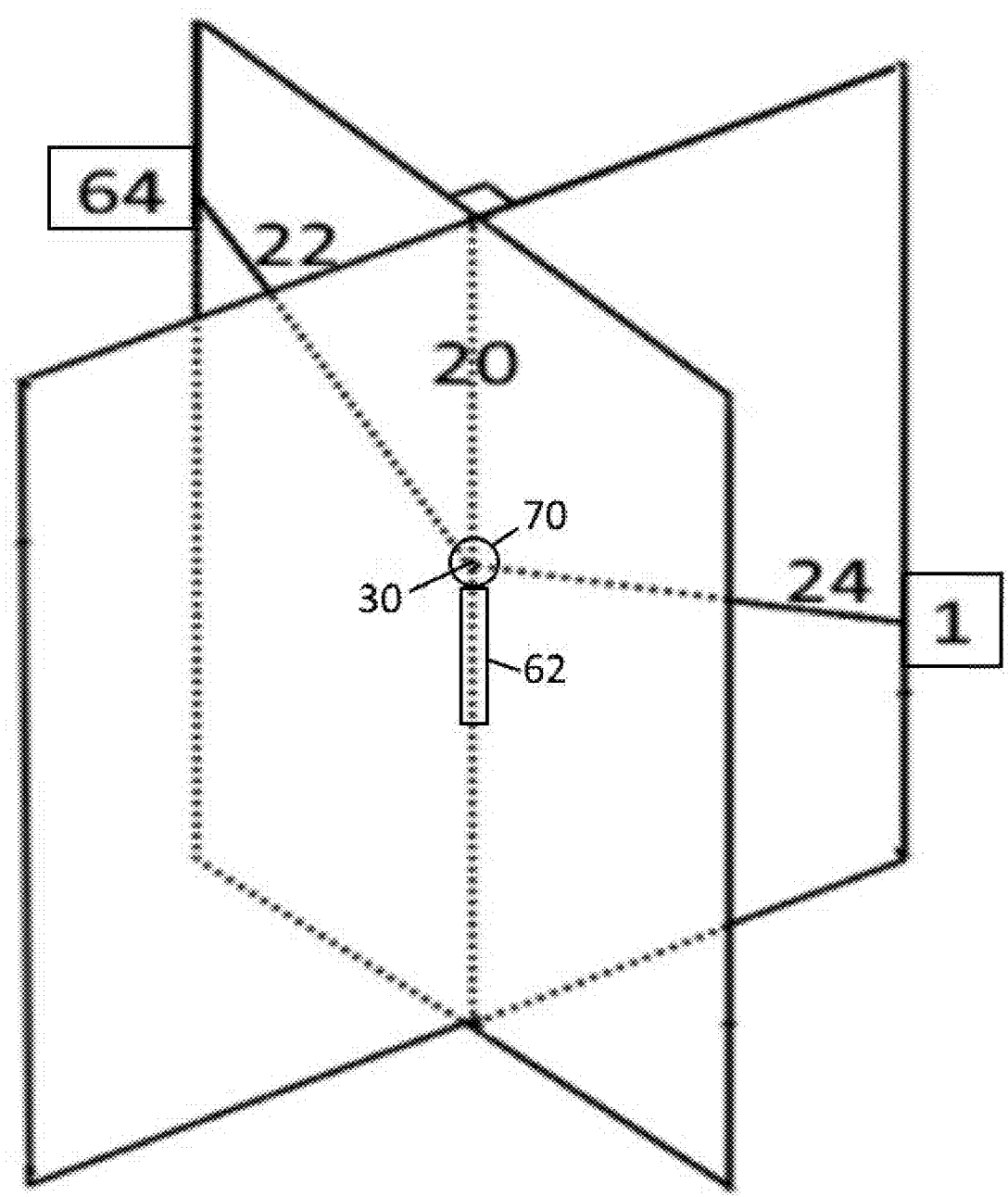
FIG. 2 is a perspective, three-dimensional view of the perpendicular arrangement between a target-line and station-line intersecting at the housing axis according to one or more embodiments of the present invention.

Referring to FIG. 2, the survey rod 62 and/or housing 70 may be positioned such that both the station-line 22 and target-line 24 perpendicularly intersect at the intersection-point 30 when the survey rod and/or housing 70 is in a true vertical position with no inclination. In such a position, the housing axis 20 is co-extensive with the survey rod axis 66, and the intersection-point 30 being positioned on both. Further, the intersection-point 30 may maintain its position when the housing 70 is rotated about the housing axis 20 for viewing the station 64 through the station-scope along the station-line 22 and for aligning the laser 40 of the rangefinder 16 along the target-line 24.

Figure 3:
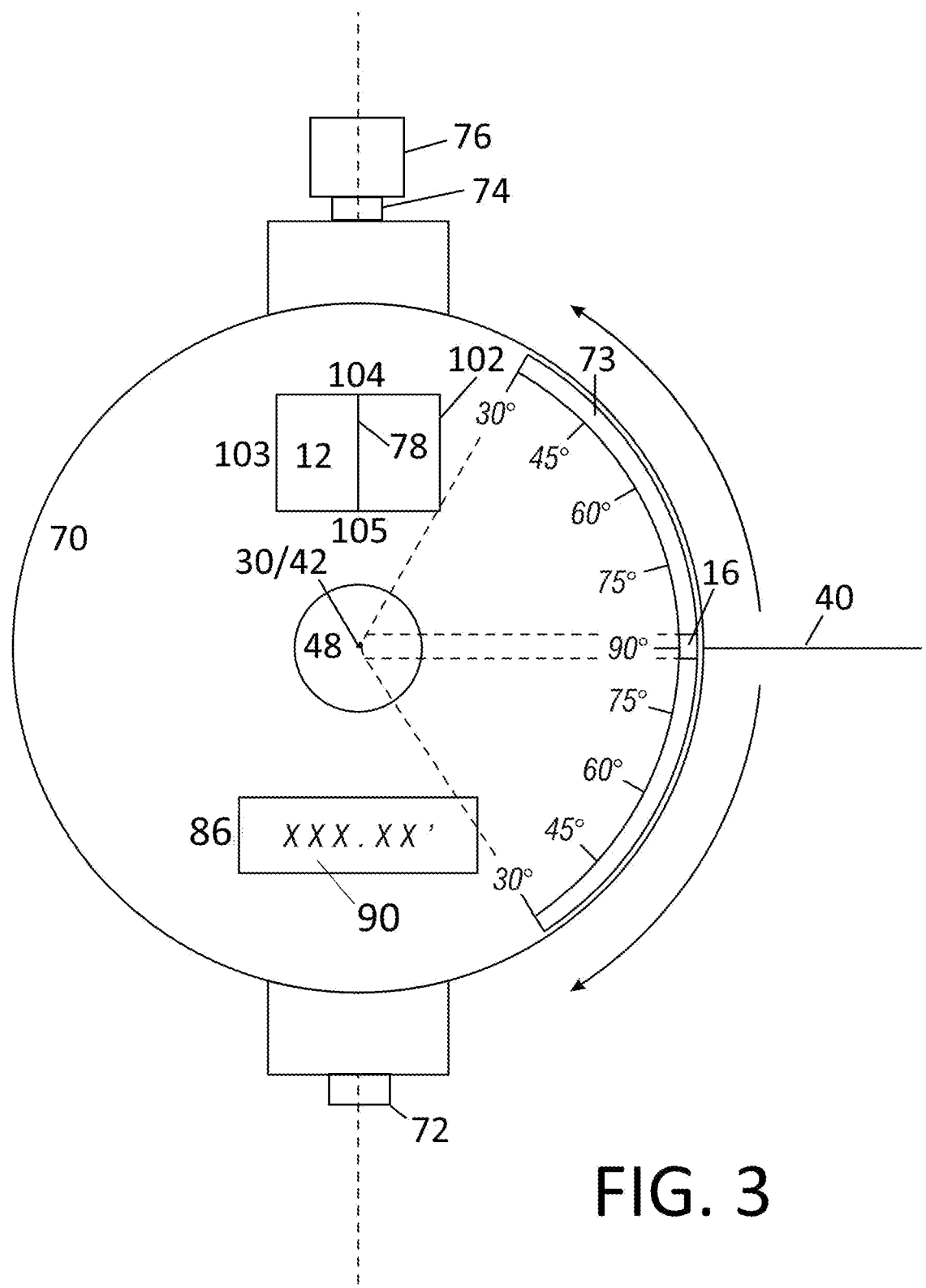
FIG. 3 is a front view of the housing of the system according to one or more embodiments of the present invention.

FIG. 3 depicts at least one embodiment of the housing 70 including a station-scope (or viewing port) 12, a rangefinder 16 having a laser 40, a rod fastener 70, a prism fastener 72, and a knob 48 (need separate housing). In some embodiments of the present invention, the station-scope 12 is a cuboid-shaped viewing port defined by the housing 70, defining six sides—a station side 100, a user side 101, a right side 102, a left side 103, a top side 104 and a bottom side 105. In the embodiment of FIG. 3, the station 64 may be viewable through the user side 101 and the station side 100. The station-scope 12 may alternatively be configured in any number of shapes, such as a cylinder, pentagonal prism or any symmetrical or non-symmetrical shape. The station-scope 12 may be equipped with a sight 78, such as an iron sight, vertical crosshair or horizontal crosshair, for viewing the station 64. The sight 78 may be affixed to a top side 104 of the station-scope 12, or housed within the station-scope 12, and may be visible within the station-scope 12 when viewed through the user side 101 to the station side 100 of the station-scope 12. While the station-scope 12 is positioned to view the station 64 along the station-line 22, the station-line 22 does not necessarily extend from the station 64 to the station-scope 12, but may instead extend from the station 64 to the intersection-point 30, which may be positioned outside of the station-scope 12 but within the housing 70. For example, in FIG. 3, the intersection-point 30 is positioned at the vertical height of the center of the knob 48 along the housing axis 20.

The laser 40 of the rangefinder 16 depicted in FIG. 3 may be incrementally rotated from a perpendicular position relative to the housing axis 20 (ninety degrees) to a thirty degree inclination North or South relative to the housing axis 20. The increments of FIG. 3 are fifteen degrees, but in some embodiments the increments may be one degree, five degrees, ten degrees, thirty degrees or some other number of degrees. In some embodiments, there may a continuous rotation. The laser 40 of the rangefinder 16 may be rotated for aligning the laser 40 with the target-line 24 since the origination point 42 of the laser 40 is in the same position as the intersection-point 30 of the housing 70. By rotating the knob 48 and repositioning the laser 40 to point at (or near) the target 1, the rangefinder 16 may electronically or wirelessly communicate the calculated slope distance to a computer within the housing 70. The computer may further read the target angle, whether incremental or continuous in nature, and calculate the horizontal distance to the target. Such calculations are well-known in the art using angles and sides of right-angle triangles. The computer may electronically or wirelessly transmit the slope distance, laser angle, horizontal distance and/or vertical distance to a display 86 for displaying. The display 86 may have a toggle feature for permitting display of two or more of these data 90. Further descriptions of these features is found herein.

The knob 48 of FIG. 3 is configured to extend from a user side of the housing 70, having a control portion 49 extending through the exterior of the housing 70 for engaging the rangefinder 16 and controlling rotation thereof. The rangefinder 16 of FIG. 3 is rotatable from thirty degrees North to thirty degrees South, and is depicted in the ninety degree position. Viewing FIGS. 6 and 7, the slit 71 of the housing is depicted in which the knob 48 rotates. The rotation of the knob is viewable through the exterior of the housing 70 using a gap 73 exposing a portion of the rangefinder 16 within the housing as it rotates. FIGS. 4 and 5 show a top and bottom view of the slit 71 within the housing according to some embodiments.

In some embodiments, the knob 48 is configured as a gripping gear-like feature on the edge of the housing 70. In other embodiments, the knob 48 may extend from the rangefinder 16, through the gap 73, for direct rotation of the rangefinder 16 using the knob 48, the knob 48 repositioning along with the repositioning of the rangefinder 16. As described herein, the rangefinder 16 may be rotated within any number of ranges, including a full three-hundred and sixty degree rotation, or any degree less. In alternative embodiments, two rangefinders 16 may be provided, each having a range of one-hundred eighty degrees or less, and positioned on opposite halves of the housing 70. Each of these rangefinders 16 may have their own corresponding gaps 73, knobs 48, displays 86 and/or lasers 16 so that the housing may be spun one-hundred and eighty degrees and use a first rangefinder 16 to view a target to the right of the housing 70 and a second rangefinder 16 to view a target to the left of the housing.

Figure 8:
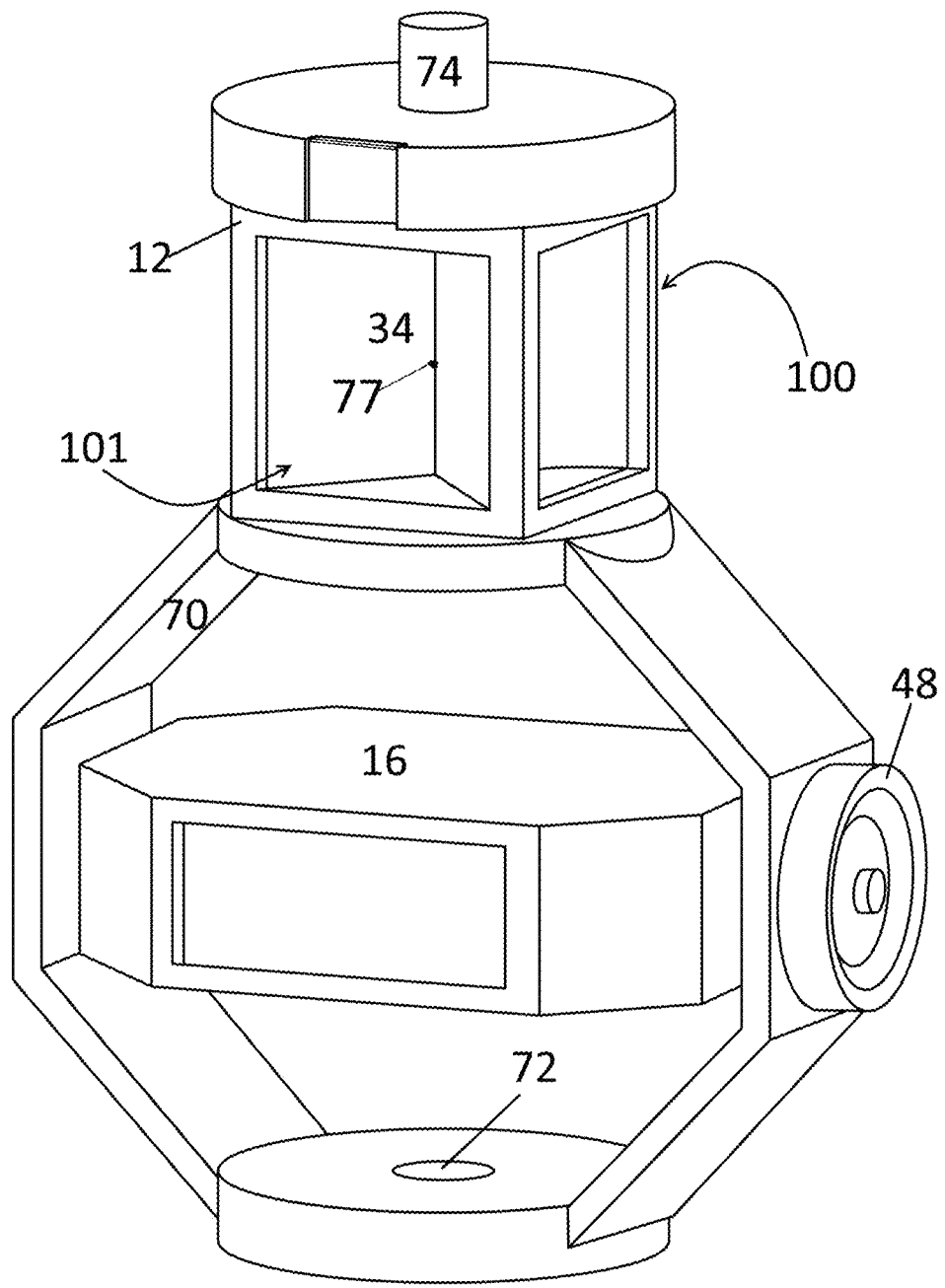
FIG. 8 is a perspective view of the system including a housing, cuboid-shaped station-scope, and a rangefinder according to one or more embodiments of the present invention.
Figure 9:
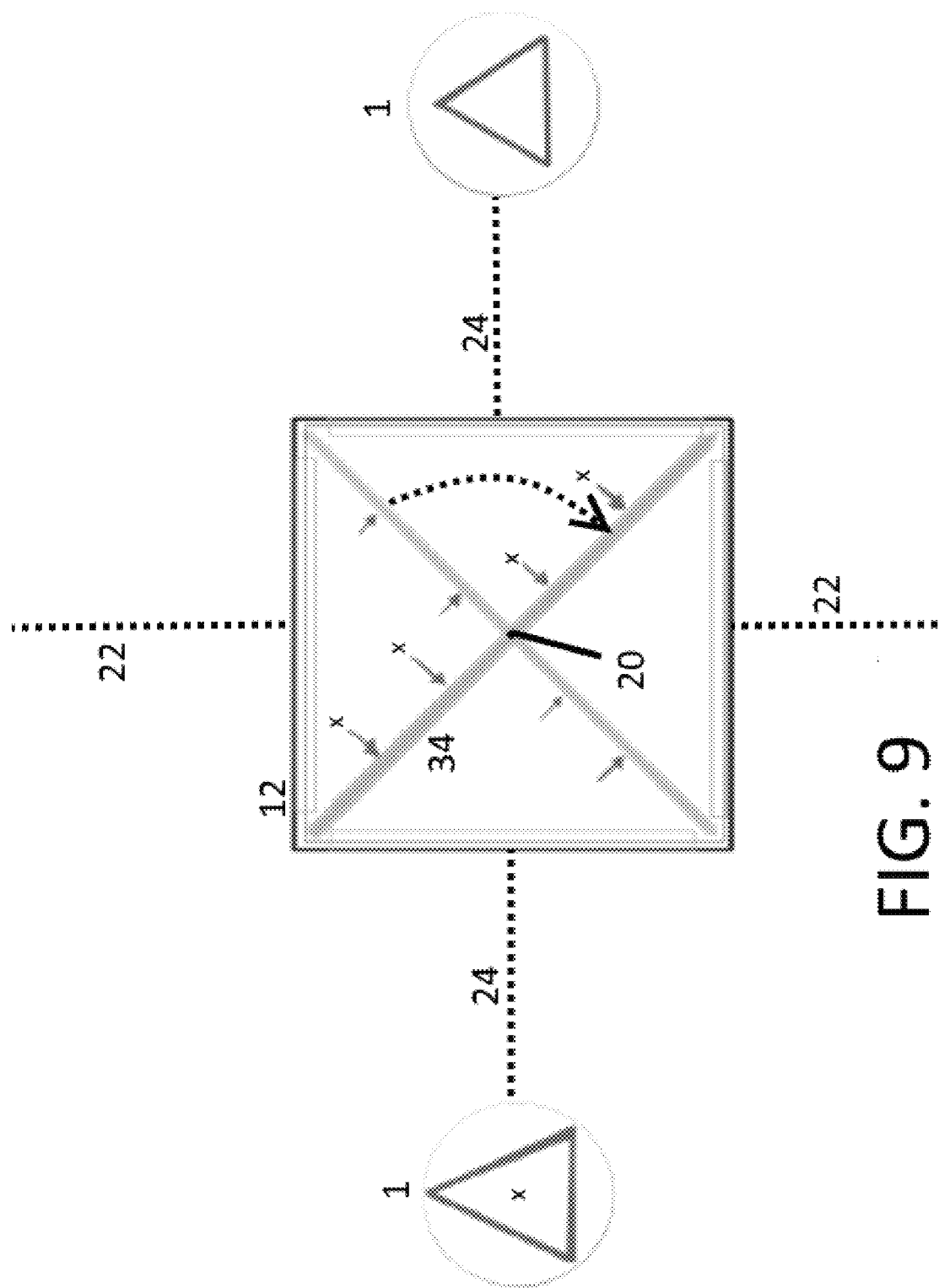
FIG. 9 is a top view of a cuboid station-scope and left and right targets according to one or more embodiments of the present invention.

In other embodiments, as depicted in FIGS. 8 and 9, the station-scope 12 may include a mirror 34 equally bisecting a cuboid volume of the station-scope 12. The mirror 34 may extend from the edge of the station side 100 and the left side 103 to the edge of the user side 101 and the right side 102. Alternatively, the mirror may extend from the edge of the station side 100 and the right side 102 to the edge of the user side 101 and the left side 103. In either alternative embodiment, the housing axis 20 equally bisects the mirror 34 and intersects at a central point 77 of the station-scope 12. The central point 77 of the mirror 34 may too lie at the intersection of the station-line 22 and the housing axis 20 and may remain in that position if the station-scope 12 is rotated about scope axis 32.

In embodiments of the station-scope 12 including a mirror 34, the station-scope 12 may be rotated about the housing axis 20. The rotation of the station-scope 12 about the housing axis 20 may be limited to ninety degrees. In a first position P1 (arrows and target 1 without Xs), the plane of the mirror 34 may rest at a forty-five degree angle with respect to the station-line 22 when the station-scope 12 is positioned to view the station 64 along the station-line 22. In a second position P2 (arrows and target 1 with Xs), the plane of the mirror 34 may rest at the opposite forty-five degree angle with respect to the station-line 22 when the station-scope 12 is positioned to view the station 64 along the station-line 22. The following image shows a first position P1 reflecting the image on the right and a second position P2 reflecting the image on the left.

The mirror 34 may be both partially transparent for viewing the station 64 along the station-line 22 and partially reflective for viewing a target 1 along a target-line 24. The mirror 34 may include glass, metal or metal coatings, plastic, tints and/or other materials. The system 10 and/or station-scope 12 may be positioned and/or rotated for viewing the station 64 and the target 1 simultaneously through the mirror 34 along both the station-line 22 and target-line 24 simultaneously. In some embodiments, the station-line 22 and the target-line 24 may perpendicularly intersect at the intersection-point 30 of the station-scope 12 and the central point 77 of the mirror 34. The mirror 34 may be electronically activatable for altering a reflective coefficient of the mirror. A wireless or physical control may be included in the system for activating the reflective coefficient electronically.

In embodiments of the station-scope 12 including a mirror 34, the system 10 may further include a light element positioned proximal the station-scope 12 and/or mirror 34 for adjusting the light received by the mirror on either the station side 100 or the user side 101. In some embodiments, the station-scope 12, or any other scope described herein, may include an eyepiece extending from a side of the scope 12 distal the station 64 for blocking light when in use. Any scope 12 may define a crosshair 78 for aligning a view. The crosshair 78 may bisect or quadrisect a circle or two or more concentric circles for aligning a view.

The cuboid-shaped station scope 12, or any other scope, may include full or partial shutters positioned on one or more sides of the scopes 12 for controlling lightness and darkness with the scopes 12. The shutter(s) may define a crosshair on an interior-facing side or may serve as a crosshair when in use. In one example, a cuboid-shaped scope 12 may include shutters on a left side, right side and station-facing side. When the station 64 and a target 1 is being viewed through the scope 12, either a left side or right side full shutter may be closed for controlling light entering the scope 12. When only a target on the left side is being viewed, full shutters positioned on the right side and station-facing side may be closed. When the station 64 is only being viewed a left side shutter and a right side shutter may be closed and a half-sized station-facing shutter may be closed, effectively serving as a crosshair on the station 64 by dividing it in half.

Although some embodiments of the invention may include a station-scope 12 having a mirror for viewing both the target 1 and the station 64, other embodiments of the invention may include a station-scope 12 for viewing the station 64 and one or two separate target-scope(s) 14 for viewing a target 1. The target-scope(s) 14 may house one or two right-angle prism(s) for viewing a target-line 24 to the target 1. When used in conjunction with the station-scope 12, the target-scope(s) 14 may be used for aligning the target-line 24 perpendicularly with the station-line 22 for taking the offset target 1 measurement. In yet another embodiment, the station-scope 12 may include a double right-angle prism for viewing the station 64 and both a left and a right target 1 simultaneously.

Any of the prisms may define a right-angle edge positioned along the housing axis 20. Further, the right-angle edge may define a midpoint centrally positioned along the right-angle edge on the housing axis 20. Any of the prism(s) may be rotatable about a target axis 26 perpendicular with the housing axis 20 for locating and viewing the target 1 along the target-line 24. The prism(s) may be rotatable about the midpoint of the edge of the prism. In embodiments including a double-right angle prism positioned with the station-scope 12, the prisms may be rotatable about a point centrally located between the edges of the two prisms.

Figure 10:
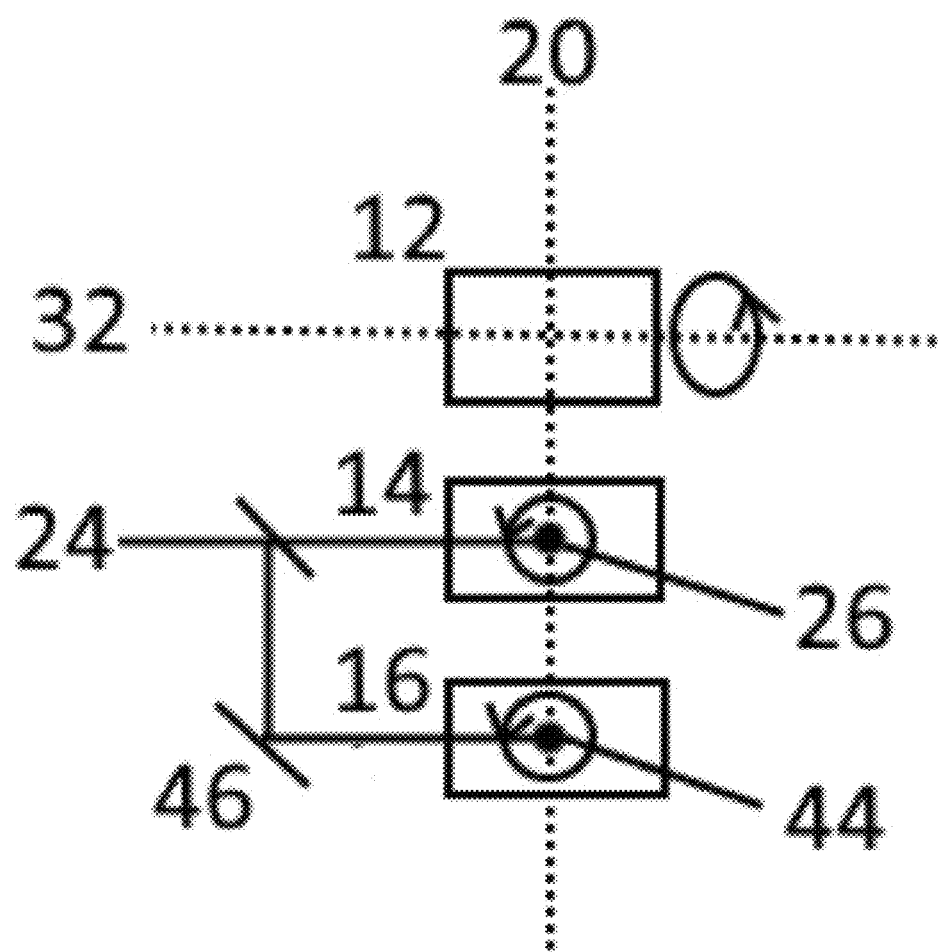
FIG. 10 depicts the relationships between the housing axis, scope axis, target axis and range axis, as well as the double-reflection of a laser to be collinear with the target-line according to one or more embodiments of the present invention.
Figure 11:
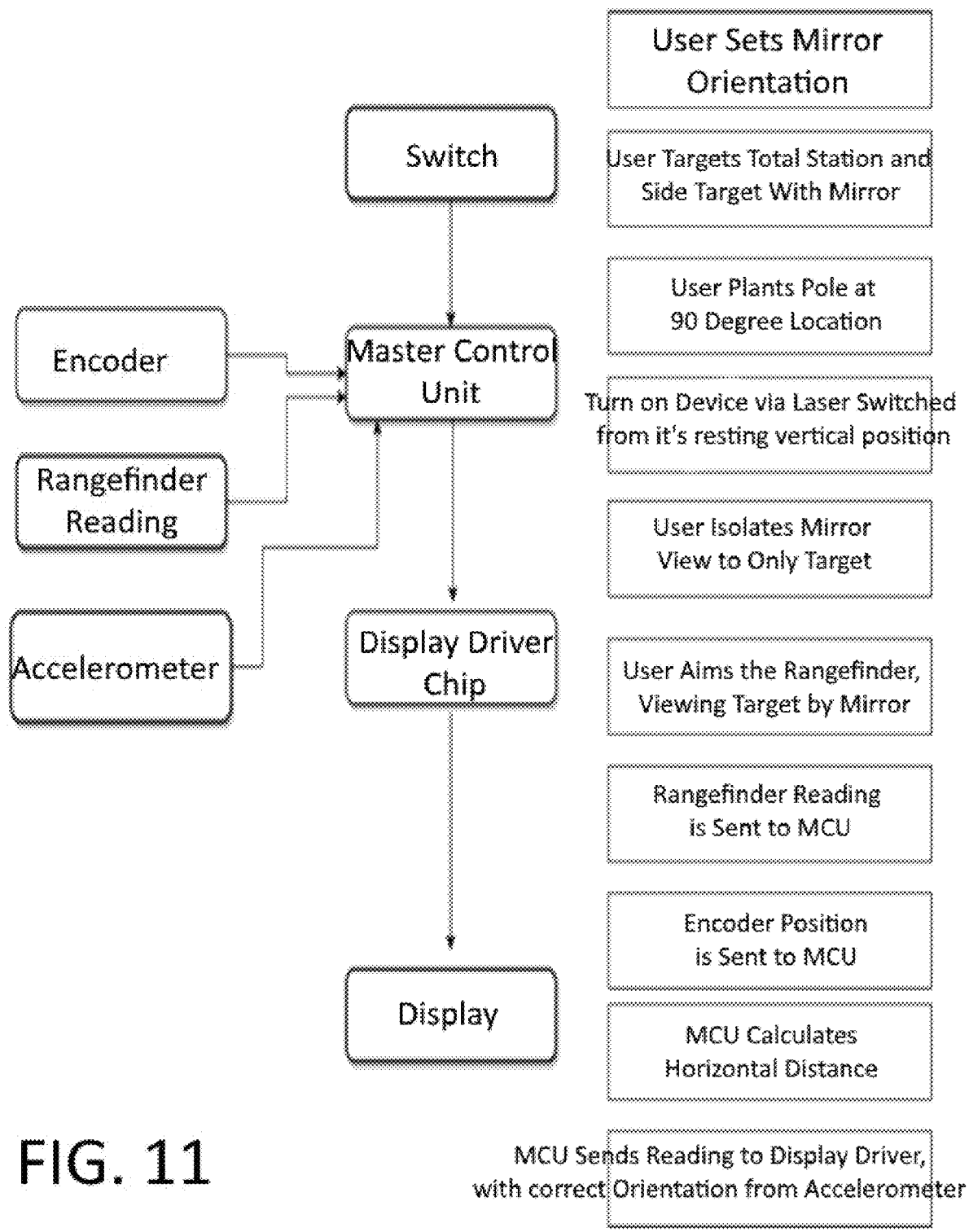
FIG. 11 illustrates method steps and data exchanges for determining a position of an obstructed target using an offset measurement by the system according to one or more embodiments of the present invention.

In some embodiments, such as is depicted in FIG. 10, the laser 40 of the rangefinder 16 may travel from the origination point 42, through a portion or all of the rangefinder 16, then be reflected for aligning the laser 40 with a target-line 24 of one of the prisms. For example, the laser may be reflected at a ninety-degree angle, then reflected at another ninety-degree angle, effectively shifting the laser's line to another parallel line collinearly aligned with one of the target-lines 24.

Many of the components of the system 10 are rotatable for aligning the system 10 into position for viewing. Any of the scopes, rangefinders or other components may be equipped with a manual, electronic and/or wireless tensioner for locking the component of the system 10 into a rotational position. Alternatively, or in addition to, the components may be equipped with a frictional element 99 for biasing the component to remain in position once rotated.

The system 10 may further include one or more displays 86 for displaying data 90. The display 86 may be positioned on the housing 70, within one or more scopes 12, on the the station 64, the rod 62 and/or a separate component of the system 10, including a graphic user interface on a remote computing device, such as a phone. The data 90 may include one or more of the following: a target slope distance, a target vertical distance, a target horizontal distance, a target position, a rangefinder horizontal angle, a rangefinder station angle, a target-scope angle, a survey rod angle, and a survey rod height. A computer and/or processor may be included in the system 10 for collecting inputs from the various components, including the component specifications, positions, angels, measurements, distances and other information. The computer and/or processor may also receive the data 90 and/or use the data 90 to create data 90 or additional information.

Input buttons may be available for providing inputs to the system 10. In some embodiments, the housing 70 may be positioned a distance from a perfect ninety degree angle between the station 64 and the target 1. In such scenarios, the distance and direction from such perfect positioning may be provided to the system 10 and used when making calculations. Similarly, for embodiments of the system 10 using incremental angle positions for the rangefinder(s) 16, adjustments to the angles may be provided to the system 10 for more accurate measurements and calculations. For example, if the rangefinder 16 may only be positioned at thirty or forty-five degrees, and the target 1 is actually positioned at thirty-five degrees (discernable by mere observation or location of laser 40 relative to target 1), then such an adjustment may be made providing the angle adjustment to the system 10.

Further, while repositioning the angle of the rangefinder 16 horizontally is depicted when the angle between the station 64 and target 1 is ninety degrees, some embodiments may provide indicators on the housing for manual input, or automatic detection of, the rotation of the rangefinder 16 about the housing axis 20 away from the ninety degree position. This data 90 may be collected, entered and/or calculated and used by the system to extrapolate various distances, angles and positions of the target 1, station 64, survey rod 62, housing 70 and/or other components.

Keep in mind that this is a sketch of the most basic model and does not illustrate the more advanced model that could retrieve vertical offset data in addition to the horizontal offset data. That model would include a keypad for inputting unit height and an additional numerical display for vertical offset data. Or, instead of an additional numerical display, maybe the one numerical display could flash both numerical values.

The system 10 may further include a transmitter for wirelessly or electronically transmitting the data 90, operating the tensioner(s), display 86, light element, laser 40 (including brightness of the laser 40), and/or rotation of any of the components of the system 10.

In some embodiments, the system 10 includes a container for transporting the system 10 and/or components of the system 10 when the rod fastener 72 is uncoupled from the survey rod 62. The container may include a belt or fastener for attaching the container to an item 3.

Various method steps have been described herein. In embodiments of the present disclosure, a system 10 is provided for providing an offset measurement of a target 1 when the target 1 is obstructed from view by a station 64. The station 64 and/or a survey rod 62 may be provided with the system 10 or may operate in conjunction with the system 10. For example, the system 10 may be coupled to a survey rod 62 and/or station prism 76. The station-line 22 between the station 64 and the housing 10 or station-scope 12 may be viewable through the station-scope 12. The station-scope 12 may be rotated about the housing axis 20 and/or the scope axis 32 for aligning the station-scope 12 for viewing along the station-line 22.

The position of the system 10, the housing 70 and/or the scopes 12 may be altered for viewing both the station 64 along the station-line 22 and the target 1 along a target-line 24 simultaneously. The repositioning may align the target-line 24 perpendicularly with the station-line 22. The intersection of the station-line 22 and the target-line 24 may rest upon the housing axis 20. One or more of the prisms may be rotated for aligning one or more of the scopes 12 for viewing along the target-line 24.

Similarly, the rangefinder(s) 16 may be rotated for aligning the laser(s) 40 with the target 1. Various iterations of repositioning, rotating and measuring may be performed. Measurement readings may be made manually and/or through the use of one or more displays 86.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. A geodesic system for measuring a position of a target when the target is obstructed from view by a station, comprising:
    a rod fastener of a housing positioned on a housing axis for selectively coupling the housing to a survey rod, wherein the housing axis is collinear with a rod axis centrally positioned within the survey rod when the system is coupled to the survey rod;
    a cuboid-shaped station-scope for viewing the station along a station-line extending between the system and the station and for viewing the target along a target-line extending between the system and the target;
        wherein the station-scope includes a mirror equally bisecting the station-scope, wherein the housing axis equally bisects the mirror, and wherein the mirror is both partially reflective for viewing the target and partially transparent for viewing the station;
    a rangefinder for aligning a laser with the target, the laser having an origination point along the housing axis.

2. The system of claim 1, further comprising an optical element positioned proximal the scope.

3. The system of claim 1, wherein the housing includes a gap for viewing rotation of the rangefinder.

4. The system of claim 1, wherein the mirror is electronically activatable for altering a reflective coefficient of the mirror.

5. The system of claim 1, wherein the system is rotatable with the rod fastener and housing axis when coupled to the survey rod.

6. The system of claim 1, further comprising a prism fastener for selectively coupling the housing with a station prism detectable by the station.

7. The system of claim 6, further comprising the station prism.

8. The system of claim 1, wherein a center point of the station-scope is positioned on a perpendicular intersection of a scope axis intercepting the station-scope and the housing axis for rotating the station-scope and viewing the station along the station-line.

9. The system of claim 1, wherein the rangefinder is rotatable on a perpendicular intersection of a range axis and the housing axis for locating the target, wherein the range axis is centrally positioned within the rangefinder.

10. The system of claim 1, wherein the station-scope defines a crosshair.

11. The system of claim 1, further comprising a display for displaying data.

12. The system of claim 11, wherein the data includes one or more of the following: a target distance, a target elevation, a target position, a rangefinder angle, a target-scope angle, a survey rod angle, and a survey rod height.

13. The system of claim 12, further comprising a transmitter for wirelessly or electronically transmitting the data.

14. The system of claim 1, further comprising the survey rod.

15. The system of claim 1, further comprising the station.

* * * * *